United States Patent
Amundsen et al.

(10) Patent No.: US 9,057,641 B2
(45) Date of Patent: *Jun. 16, 2015

(54) METHOD OF AND SYSTEM FOR DETECTING OBJECT WEIGHING INTERFERENCES

(71) Applicant: METROLOGIC INSTRUMENTS, INC., Blackwood, NJ (US)

(72) Inventors: Thomas Amundsen, Turnerville, NJ (US); Sean Philip Kearney, Marlton, NJ (US); Shane Michael Edmonds, Monroeville, NJ (US); Ynjiun Paul Wang, Cupertino, CA (US); Timothy Good, Clementon, NJ (US); Michael Miraglia, Hamilton, NJ (US); Charles Joseph Cunningham, IV, Havertown, PA (US); Xiaoxun Zhu, Suzhou (CN); Patrick Anthony Giordano, Glassboro, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,188

(22) Filed: Jul. 21, 2014

(65) Prior Publication Data
US 2014/0326518 A1 Nov. 6, 2014

Related U.S. Application Data

(63) Continuation of application No. 13/246,936, filed on Sep. 28, 2011, now Pat. No. 8,794,525.

(51) Int. Cl.
*G06Q 20/00* (2012.01)
*G01G 19/414* (2006.01)
*G07G 1/00* (2006.01)
*G01G 23/00* (2006.01)
*G06Q 20/20* (2012.01)

(52) U.S. Cl.
CPC .......... *G01G 19/4144* (2013.01); *G07G 1/0045* (2013.01); *G01G 23/00* (2013.01); *G06Q 20/208* (2013.01)

(58) Field of Classification Search
CPC ........................... G06Q 20/08; G06K 7/10594
USPC ............................................ 235/454, 462.14
See application file for complete search history.

(56) References Cited

U.S. PATENT DOCUMENTS

| | | | |
|---|---|---|---|
| 6,758,402 B1 | 7/2004 | Check et al. | |
| 6,814,292 B2 | 11/2004 | Good | |
| 6,918,540 B2 | 7/2005 | Good | |
| 6,951,304 B2 | 10/2005 | Good | |

(Continued)

*Primary Examiner* — Christle I Marhsall
(74) *Attorney, Agent, or Firm* — Additon, Higgins & Pendleton, P.A.

(57) ABSTRACT

A POS-based checkout/scale system having (i) a bar code symbol reading subsystem for reading bar code symbols on products being purchased at a retail POS station, and (ii) a produce weigh scale having a weigh scale assembly for weighing one or more produce items on a weigh platter during produce weighing operations carried out at the time of checkout at said retail POS station. The system also includes an automatic produce weighing interference detection subsystem, supporting an IR-based light curtain about the weigh platter, automatically detects when any object is overhanging the weigh platter during produce weighing operations, and generates an alert signal when such conditions are automatically detected.

20 Claims, 15 Drawing Sheets

(56) References Cited

U.S. PATENT DOCUMENTS

| | | |
|---|---|---|
| 6,982,388 B2 | 1/2006 | Kasinoff |
| 6,991,167 B2 | 1/2006 | Check et al. |
| 7,051,922 B2 | 5/2006 | Check et al. |
| 7,083,102 B2 | 8/2006 | Good et al. |
| 7,086,597 B2 | 8/2006 | Good |
| 7,152,795 B2 | 12/2006 | Tsikos et al. |
| 7,296,748 B2 | 11/2007 | Good |
| 7,314,176 B2 | 1/2008 | Good |
| 7,341,192 B2 | 3/2008 | Good |
| 7,374,094 B2 | 5/2008 | Good |
| 7,383,996 B2 | 6/2008 | Good et al. |
| 7,407,103 B2 | 8/2008 | Check et al. |
| 7,422,156 B2 | 9/2008 | Good |
| 7,510,118 B2 | 3/2009 | Ralph et al. |
| 7,516,898 B2 | 4/2009 | Knowles et al. |
| 7,527,204 B2 | 5/2009 | Knowles et al. |
| 7,533,819 B2 | 5/2009 | Barkan et al. |
| 7,537,165 B2 | 5/2009 | Knowles et al. |
| 7,540,422 B2 | 6/2009 | Knowles et al. |
| 7,546,952 B2 | 6/2009 | Knowles et al. |
| 7,546,953 B1 | 6/2009 | Collins, Jr. |
| 7,556,199 B2 | 7/2009 | Knowles et al. |
| 7,559,474 B2 | 7/2009 | Knowles et al. |
| 7,568,626 B2 | 8/2009 | Knowles et al. |
| 7,571,858 B2 | 8/2009 | Knowles et al. |
| 7,575,169 B2 | 8/2009 | Knowles et al. |
| 7,575,170 B2 | 8/2009 | Knowles et al. |
| 7,578,445 B2 | 8/2009 | Knowles et al. |
| 7,581,680 B2 | 9/2009 | Knowles et al. |
| 7,594,609 B2 | 9/2009 | Kotlarsky et al. |
| 7,611,062 B2 | 11/2009 | Knowles et al. |
| 7,614,560 B2 | 11/2009 | Knowles et al. |
| 7,637,432 B2 | 12/2009 | Kotlarsky et al. |
| 7,651,028 B2 | 1/2010 | Knowles et al. |
| 7,654,461 B2 | 2/2010 | Kotlarsky et al. |
| 7,658,330 B2 | 2/2010 | Knowles et al. |
| 7,661,595 B2 | 2/2010 | Knowles et al. |
| 7,673,802 B2 | 3/2010 | Knowles et al. |
| 7,712,666 B2 | 5/2010 | Kotlarsky et al. |
| 7,757,955 B2 | 7/2010 | Barkan |
| 7,775,436 B2 | 8/2010 | Knowles et al. |
| 7,787,309 B2 | 8/2010 | Liu |
| 7,798,410 B2 | 9/2010 | Carlson et al. |
| 7,806,335 B2 | 10/2010 | Knowles et al. |
| 7,819,326 B2 | 10/2010 | Knowles et al. |
| D631,478 S | 1/2011 | McQueen et al. |
| 7,878,407 B2 | 2/2011 | Knowles et al. |
| 7,905,413 B2 | 3/2011 | Knowles et al. |
| 7,954,719 B2 | 6/2011 | Zhu et al. |
| 8,033,472 B2 | 10/2011 | Giebel et al. |
| 8,042,740 B2 | 10/2011 | Knowles et al. |
| 8,052,057 B2 | 11/2011 | Smith et al. |
| 8,157,174 B2 | 4/2012 | Kotlarsky et al. |
| 8,556,175 B2 | 10/2013 | McQueen et al. |
| 8,561,902 B2 | 10/2013 | McQueen et al. |
| 8,561,905 B2 * | 10/2013 | Edmonds et al. ........ 235/462.14 |
| 8,794,525 B2 * | 8/2014 | Amundsen et al. ...... 235/462.14 |
| 2004/0000591 A1 | 1/2004 | Collins et al. |
| 2004/0217175 A1 | 11/2004 | Bobba et al. |
| 2005/0072605 A1 | 4/2005 | Kunzi et al. |
| 2005/0098634 A1 | 5/2005 | Good |
| 2005/0103850 A1 | 5/2005 | Mergenthaler et al. |
| 2007/0063045 A1 | 3/2007 | Acosta et al. |
| 2007/0221733 A1 | 9/2007 | Roquemore |
| 2008/0164309 A1 | 7/2008 | Latimer et al. |
| 2008/0249884 A1 | 10/2008 | Knowles et al. |
| 2009/0188980 A1 | 7/2009 | Bobba et al. |
| 2010/0139989 A1 | 6/2010 | Atwater et al. |
| 2010/0148967 A1 | 6/2010 | Friend et al. |
| 2010/0163626 A1 | 7/2010 | Olmstead |
| 2010/0163627 A1 | 7/2010 | Olmstead |
| 2010/0163628 A1 | 7/2010 | Olmstead |
| 2010/0252633 A1 | 10/2010 | Barkan et al. |
| 2011/0008924 A1 | 1/2011 | Yang Jong et al. |
| 2011/0089240 A1 | 4/2011 | Vinogradov et al. |
| 2011/0127333 A1 | 6/2011 | Veksland et al. |
| 2011/0132985 A1 | 6/2011 | McQueen et al. |
| 2011/0232972 A1 | 9/2011 | McQueen et al. |
| 2012/0008987 A1 | 1/2012 | Ochiai |
| 2012/0019346 A1 | 1/2012 | Levi |
| 2012/0021296 A1 | 1/2012 | Funada et al. |
| 2012/0193416 A1 | 8/2012 | Smith et al. |
| 2012/0211565 A1 | 8/2012 | Colavito et al. |
| 2013/0075168 A1 | 3/2013 | Amundsen et al. |
| 2014/0027518 A1 * | 1/2014 | Edmonds et al. ........ 235/462.14 |

* cited by examiner

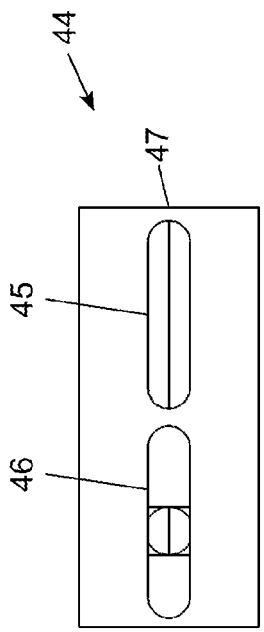
FIG. 4A3
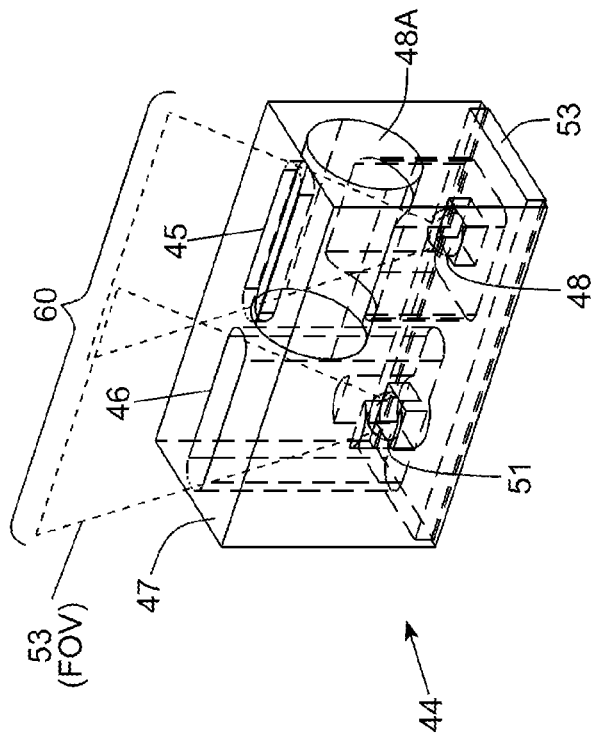
FIG. 4A4
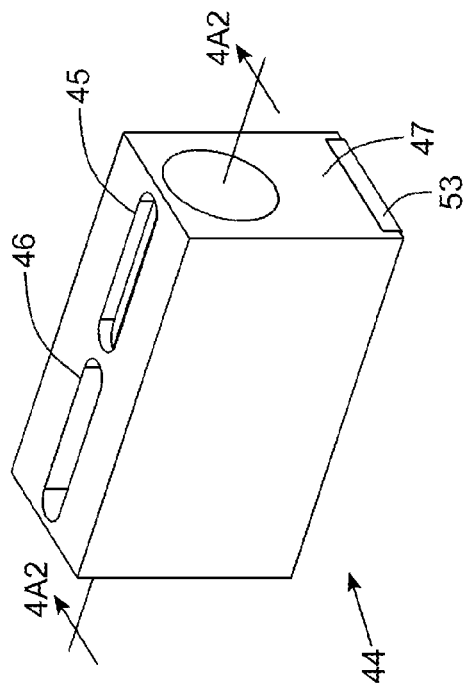
FIG. 4A1
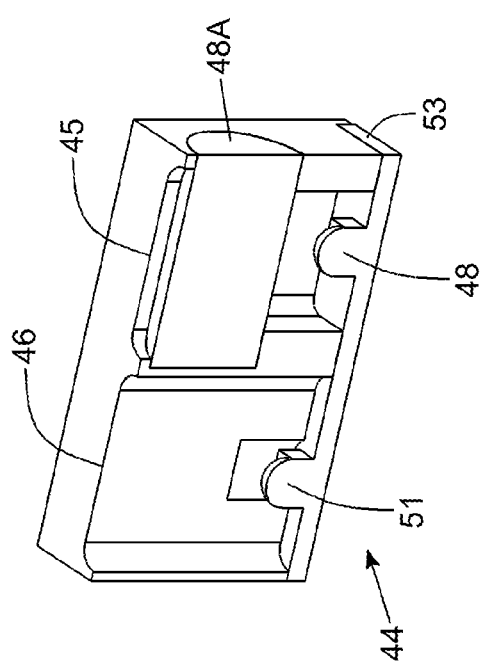
FIG. 4A2

METHOD OF AND SYSTEM FOR DETECTING OBJECT WEIGHING INTERFERENCES

CROSS-REFERENCE TO RELATED APPLICATIONS

The present application claims the benefit of U.S. patent application Ser. No. 13/246,936 for a Method of and System for Detecting Produce Weighing Interferences in a POS-Based Checkout/Scale System filed Sep. 28, 2011 (and published Mar. 28, 2013 as U.S. Patent Application Publication No. 2013/0075168), now U.S. Pat. No. 8,794,525. Each of the foregoing patent application, patent publication, and patent is hereby incorporated by reference in its entirety.

U.S. patent application Ser. No. 14/050,515 for a Hybrid-Type Bioptical Laser Scanning and Digital Imaging System Supporting Automatic Object Motion Detection at the Edges of a 3D Scanning Volume filed Oct. 10, 2013 (and published Jan. 30, 2014 as U.S. Patent Application Publication No. 2014/0027518) also claims the benefit of U.S. patent application Ser. No. 13/246,936. U.S. patent application Ser. No. 14/050,515 also claims the benefit of U.S. patent application Ser. No. 13/160,873 for a Hybrid-Type Bioptical Laser Scanning and Digital Imaging System Supporting Automatic Object Motion Detection at the Edges of a 3D Scanning Volume filed Jun. 15, 2011 (and published Oct. 22, 2013 as U.S. Patent Application Publication No. 2012/0318869), now U.S. Pat. No. 8,561,905. Each of the foregoing patent applications, patent publications, and patent is hereby incorporated by reference in its entirety.

FIELD OF DISCLOSURE

The present disclosure relates generally to improvements in weighing produce items using POS-based checkout/scale stations installed at retail point-of-sale (POS) environments.

BACKGROUND

Retailers experience "shrink" or loss of revenue due partially to cashiers incorrectly undercharging customers for produce items requiring weighing at the time of check-out in supermarkets.

In the POS environment, it is typically possible to place produce items on the weigh-platter of the scanner in such a manner that the items interfere with at least one of the following: (a) the check-out counter; (b) a section of the barcode scanner other than the weigh platter; (c) the operator; and (d) other objects in close proximity to the weigh platter.

However, despite many improvements made in POS checkout/scale systems, there is still a great need in the art for improved ways of reducing shrinkage during produce item weighing operations, while avoiding the shortcomings and drawbacks of prior art systems and methodologies.

SUMMARY

Accordingly, a primary object of the present disclosure is to provide an improved bi-optical checkout/scale system for use in POS environments, which is free of the shortcomings and drawbacks of prior art systems and methodologies.

Another object is to provide a POS checkout/scale system with an automatic produce weighing interference detection subsystem, supporting an IR-based light curtain about its weigh platter, and capable of automatically detecting when any object is overhanging the weigh platter during produce weighing operations, and generating an alert signal when such conditions are automatically detected.

Another object is to provide a POS checkout/scale system with an automatic produce weighing interference detection subsystem, wherein if a produce item or object is placed on the weigh platter and extends outside of the physical bounds of the weigh platter about which the IR-based light curtain extends, then the automatic produce weighing interference detection subsystem will automatically detect the potential interference condition, and generate an alert signal to the cashier.

Another object is to provide a POS checkout/scale system with an automatic produce weighing interference detection subsystem, wherein appropriate circuitry and software are configured for the purpose of alerting the end-user of the presence of the interference condition about the weigh platter.

Another object is to provide a POS-based bi-optical checkout/scale system, wherein a laser scanning subsystem projects laser scanning planes through horizontal and vertical scanning windows and into a 3D scanning volume defined between the vertical and horizontal scanning windows, and wherein an automatic produce weighing interference detection subsystem, supporting an IR-based light curtain about its weigh platter, automatically detects when any object is overhanging the weigh platter during produce weighing operations, and generates an alert signal when such conditions are automatically detected.

Another object is to provide a POS-based bi-optical checkout/scale system, wherein a digital imaging subsystem projects a field of view (FOV) through an imaging window and into a 3D imaging volume when an object is detected passing through the edge of the 3D scanning volume, and wherein an automatic produce weighing interference detection subsystem, supporting an IR-based light curtain about its weigh platter formed by a set of IR-based object detection planes, for automatically detecting when a produce item is overhanging the weigh platter during produce weighing operations, and automatically generating an alert signal when such conditions are detected.

Another object is to provide a POS-based bi-optical checkout/scale system, wherein the automatic produce weighing interference detection subsystem comprises a plurality of object detection modules installed about the first, second and third edges of the weigh platter so as to project pairs of planar IR-based object detection planes at the outer edges of the weigh platter, so as to enable automatic detection of produce items extending outside the boundaries of the weight platter, and generate alert signals at the POS during produce weighing operations.

Another object is to provide a new and improved weigh platter for a POS-based checkout/scale system that is capable of automatically detecting produce weighing interference conditions occurring during produce weighing operations, and alerting the cashier of the same to reposition and reweigh the produce items to eliminate shrinkage at the POS station.

Another object is to provide a new and improved method of weighing produce items at a POS-based checkout/scale system, wherein produce weighing interference conditions are automatically detected during produce weighing operations, and the cashier is alerted of the same to reposition and reweigh the produce items to eliminate shrinkage at the POS station.

Another object is to provide a POS-based product checkout scanner and scale system that helps provide improvements in worker productivity and checkout speed and throughput.

These and other objects will become apparent hereinafter and in the Claims appended hereto.

BRIEF DESCRIPTION OF THE DRAWINGS

In order to more fully understand the present disclosure, the following Detailed Description of the Illustrative Embodiments should be read in conjunction with the accompanying figure Drawings, wherein:

FIG. 4A1 is a perspective view of a single IR-based object detection module employed in the construction of the automatic produce weighing interference detection subsystem in the POS-based bi-optical checkout/scale system shown in FIGS. 1A through 4;

FIG. 4A2 is a plan view of a single IR-based object detection module shown in FIG. 4A1;

FIG. 4A3 is a cross-sectional view of a single IR-based object detection module shown in FIG. 4A1, taken along line 4A3-4A3 shown therein;

FIG. 4A4 is a perspective partial phantom view of a single IR-based object detection module shown in FIG. 4A1;

DETAILED DESCRIPTION

Figure 1:
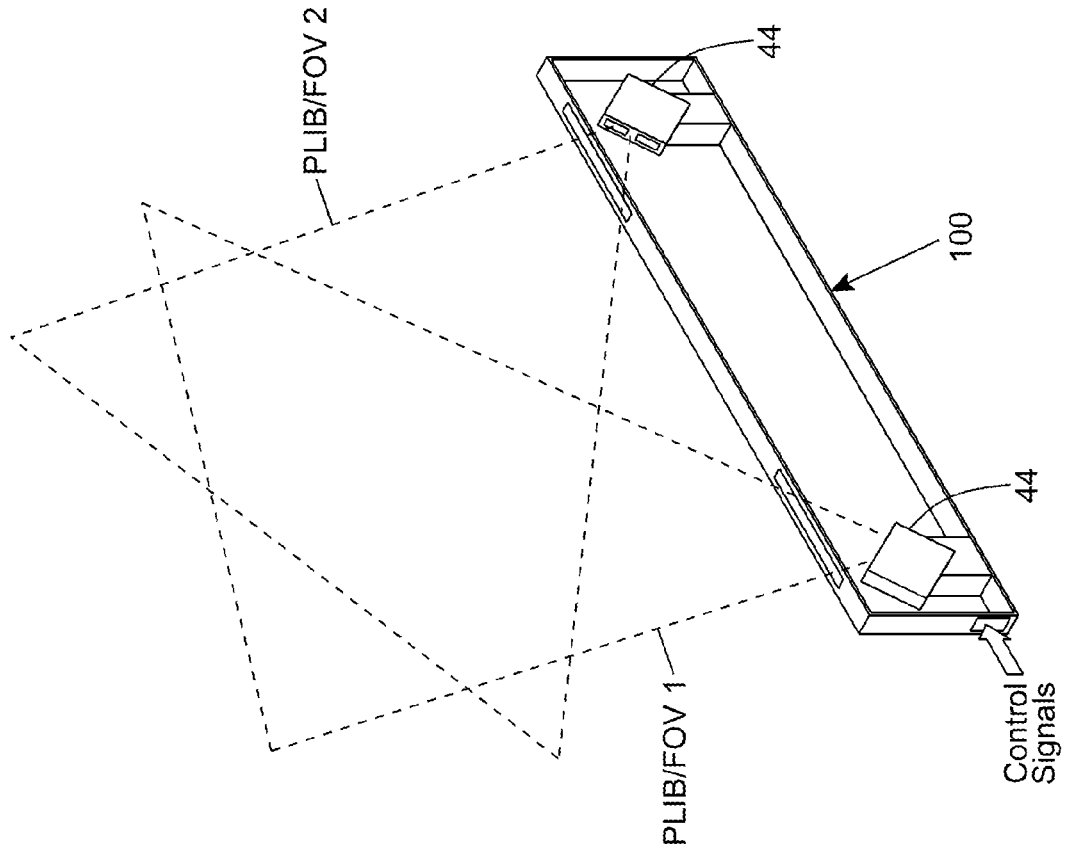
FIG. 1 is a perspective view of an IR-based light curtain generating panel that is shown mounted to each of the three sides of the POS-based bi-optical checkout/scale system shown in FIG. 1A, surrounding its weigh platter, and providing the object sensing component of the automatic produce weighing interference detection subsystem employed in the POS-based bi-optical checkout/scale subsystem schematically depicted in FIG. 3, and supporting the generation of an IR-based light curtain about the weigh platter comprising a plurality of coplanar IR light beams and field of view (FOVs)

Referring to the figures in the accompanying Drawings, the various illustrative embodiments of the apparatus and methodologies will be described in great detail, wherein like elements will be indicated using like reference numerals.

Figure 1A:
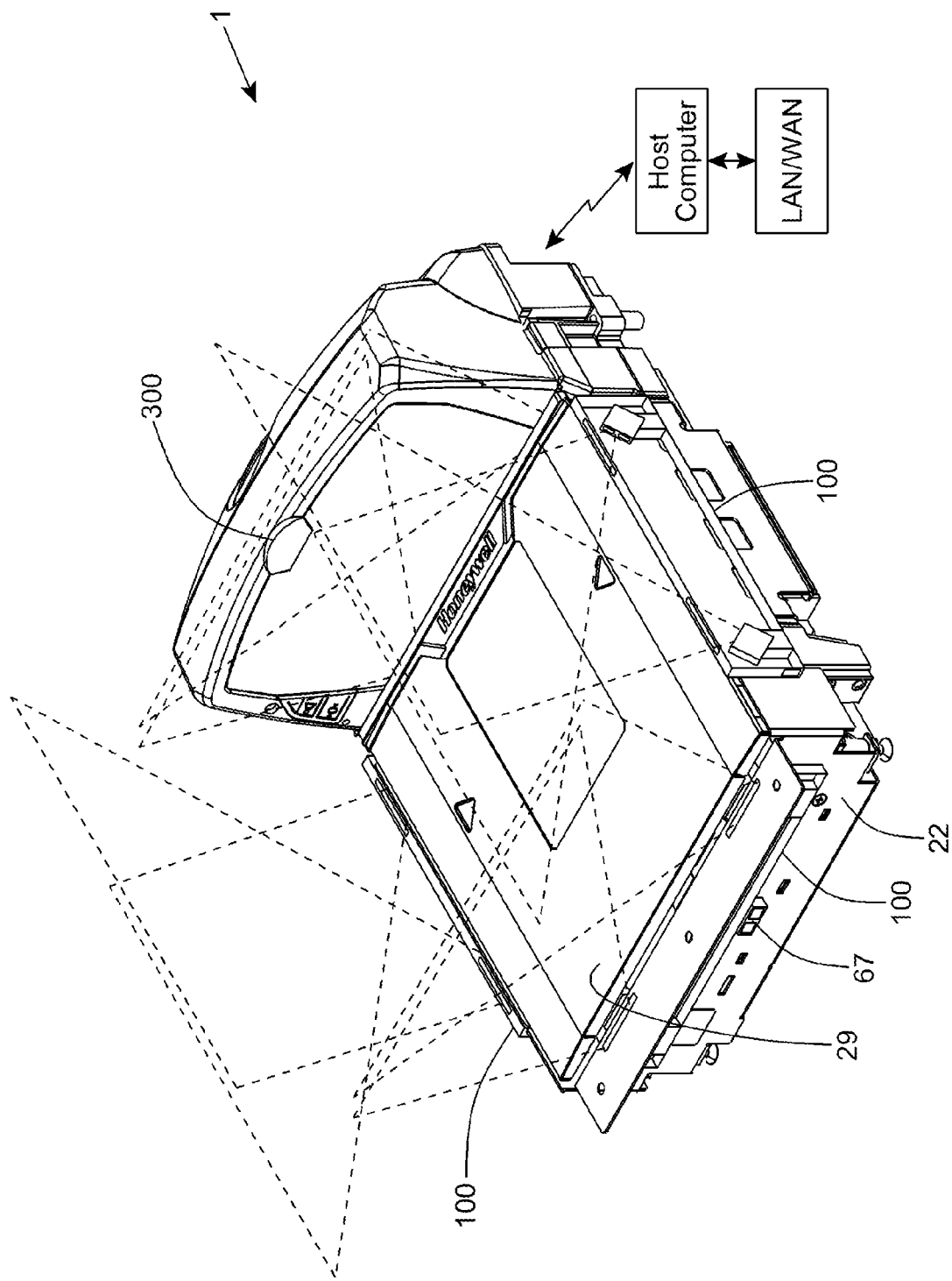
FIG. 1A is a perspective view of the POS-based bi-optical checkout/scale system of the illustrative embodiment of the present disclosure for installation and use at a point of sale (POS) checkout station in a retail environment, showing the invisible IR-based light curtain being generated about the weigh platter, for supporting produce interference detection during produce weighing operations, and in addition, supporting edge-based object motion detection functions during scanner checkout operations.
Figure 4:
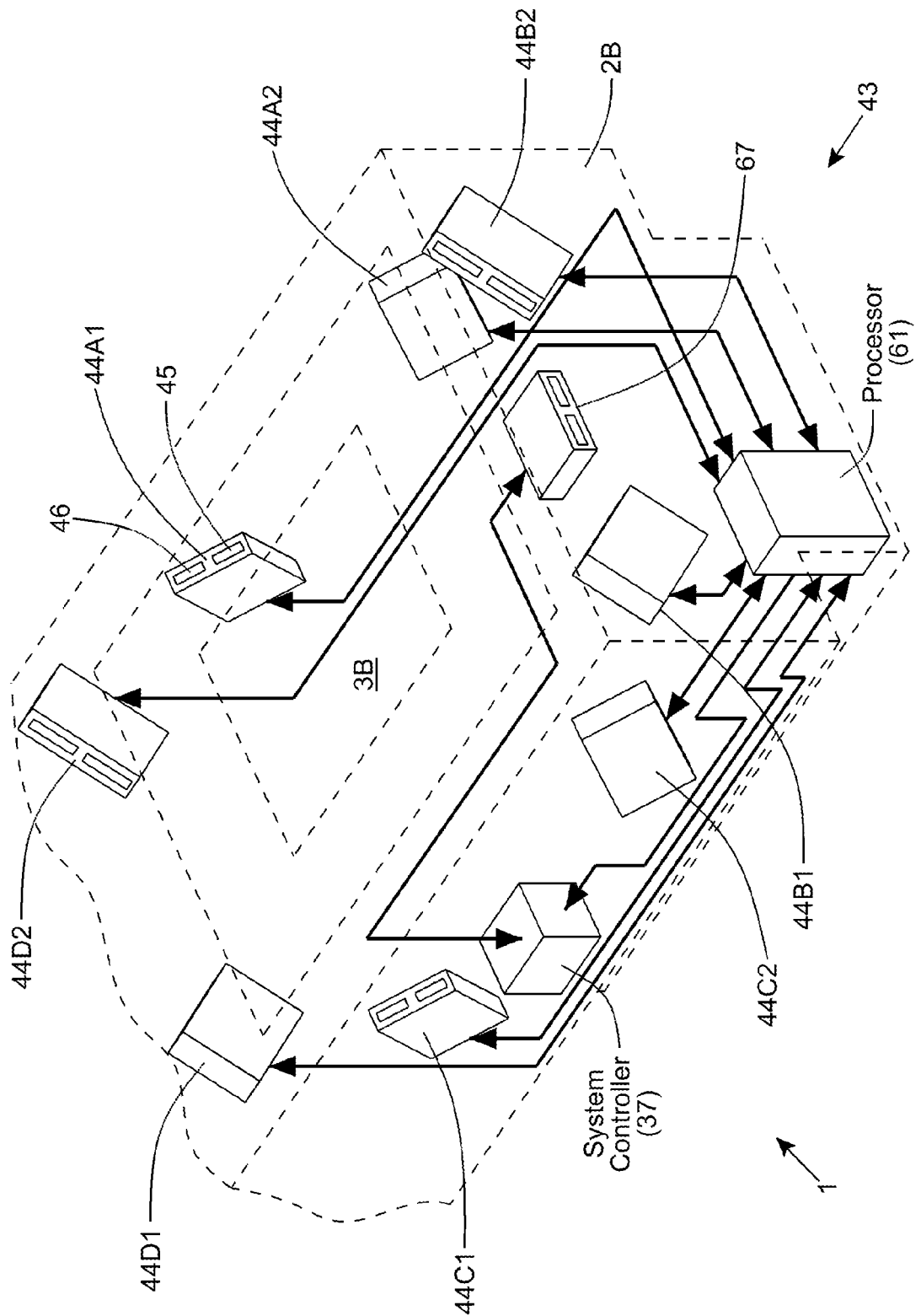
FIG. 4 is a partially cut-away perspective view of the POS-based bi-optical checkout/scale system of FIGS. 1A through 3, showing IR-based object detection modules of its automatic produce weighing interference detection subsystem, for automatically detecting produce items extending beyond the spatial boundaries of the weigh platter mounted within the horizontal housing section of the system.

FIGS. 1A through 4A4 show an illustrative embodiment of the POS-based bi-optical checkout/scale system 1 of the present disclosure supporting two different modes of operation, namely: (i) a sleep mode of operation; (ii) a bar code symbol reading mode of operation; and (iii) a produce weighing mode of operation. The POS-based bi-optical scanning/scale system 1 of the present disclosure, and its various modes of operation, will now be described below in great technical detail.

Figure 1B:
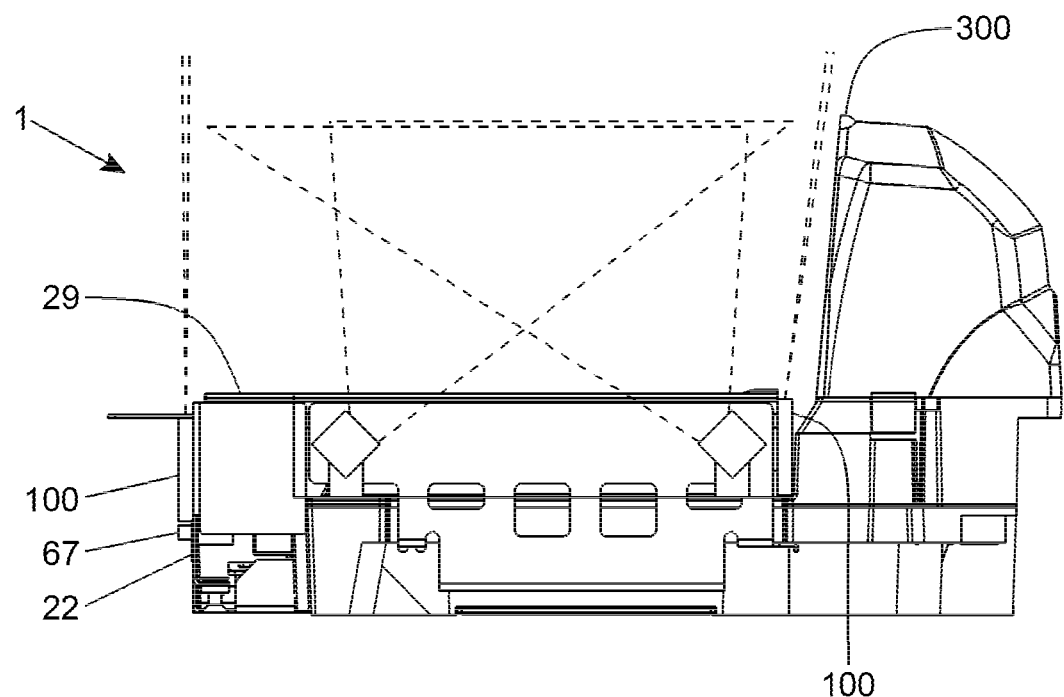
FIG. 1B is a first side view of the POS-based bi-optical checkout/scale system of FIG. 1A, showing the invisible IR-based light curtain from this first side view of the system.
Figure 1C:
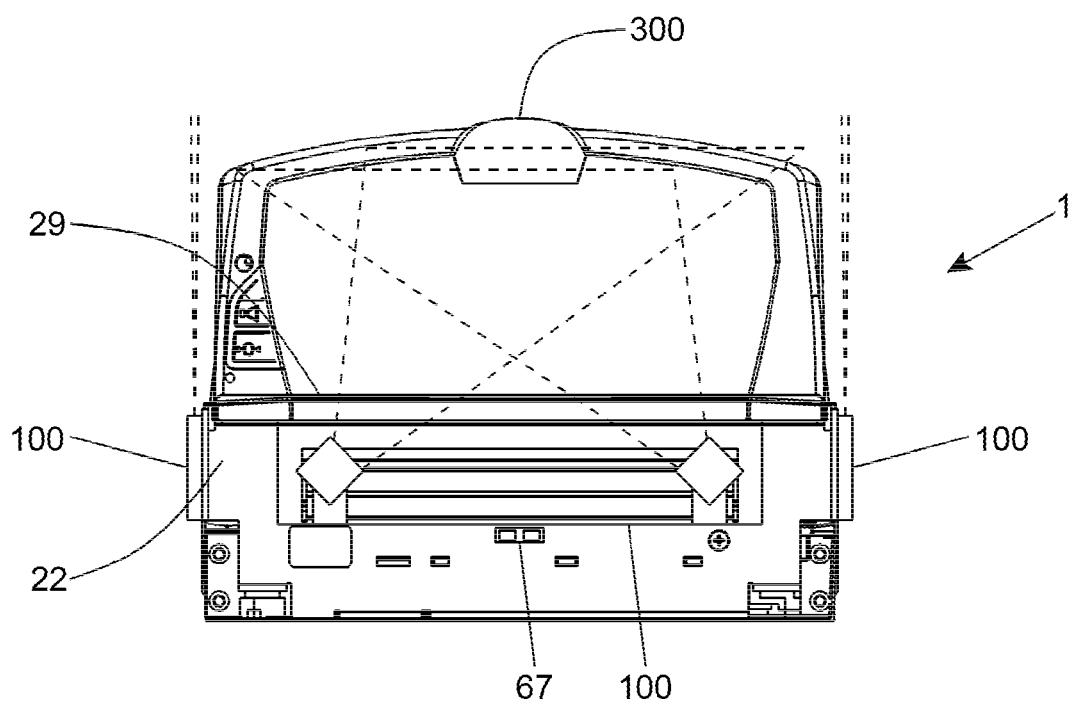
FIG. 1C is a second side view of the POS-based bi-optical checkout/scale system of FIG. 1A, showing the invisible IR-based light curtain from this second side view of the system.

As shown in FIGS. 1A, 1B and 1C, the POS-based bi-optical scanning/scale system 1 includes a system housing 2 having a vertical housing section 2A having a vertical optically transparent (glass) scanning window 3A, and a horizontal housing section 2B having a horizontal optically transparent (glass) scanning window 3B having first, second, third and fourth edges. Typically, the system is installed at a retail point of sale (POS) checkout station, well known in the art. The retail POS station will have a countertop surface, and oftentimes a conveyor belt for moving products towards the bar code symbol reading system. Also provided is a host computer system 9 that is connected to the retail LAN and/or WAN on which one or more product price database systems (RDBMS) will be deployed.

As shown in the first illustrative embodiment, the horizontal and vertical sections 2A and 2B of the system housing are arranged in an orthogonal relationship with respect to each other such that the horizontal vertical scanning windows are substantially perpendicular. In the illustrative embodiment, a bar code symbol reading system 150 supporting first and second laser scanning stations 150A and 150B, is mounted within the system housing, and generates and projects a complex group of laser scanning planes through laser scanning windows 3A and 3B. These laser scanning planes intersect and produce an omni-directional laser scanning pattern within a 3D scanning volume 98 defined between the vertical and horizontal scanning windows 3A and 3B, as shown in FIGS. 1 and 1C. As shown in FIG. 1A, the 3D scanning volume is bounded by the vertical scanning window 3A and the first, second, and third edges of the horizontal scanning window 3B. In the illustrative embodiment, each laser scanning station 150A, 150B is constructed from a rotating polygon, a laser diode source, light collection optics, a photodiode, and other optical components arranged as disclosed in U.S. Pat. No. 7,422,156, incorporated herein by reference, as if set forth fully herein.

Figure 3:
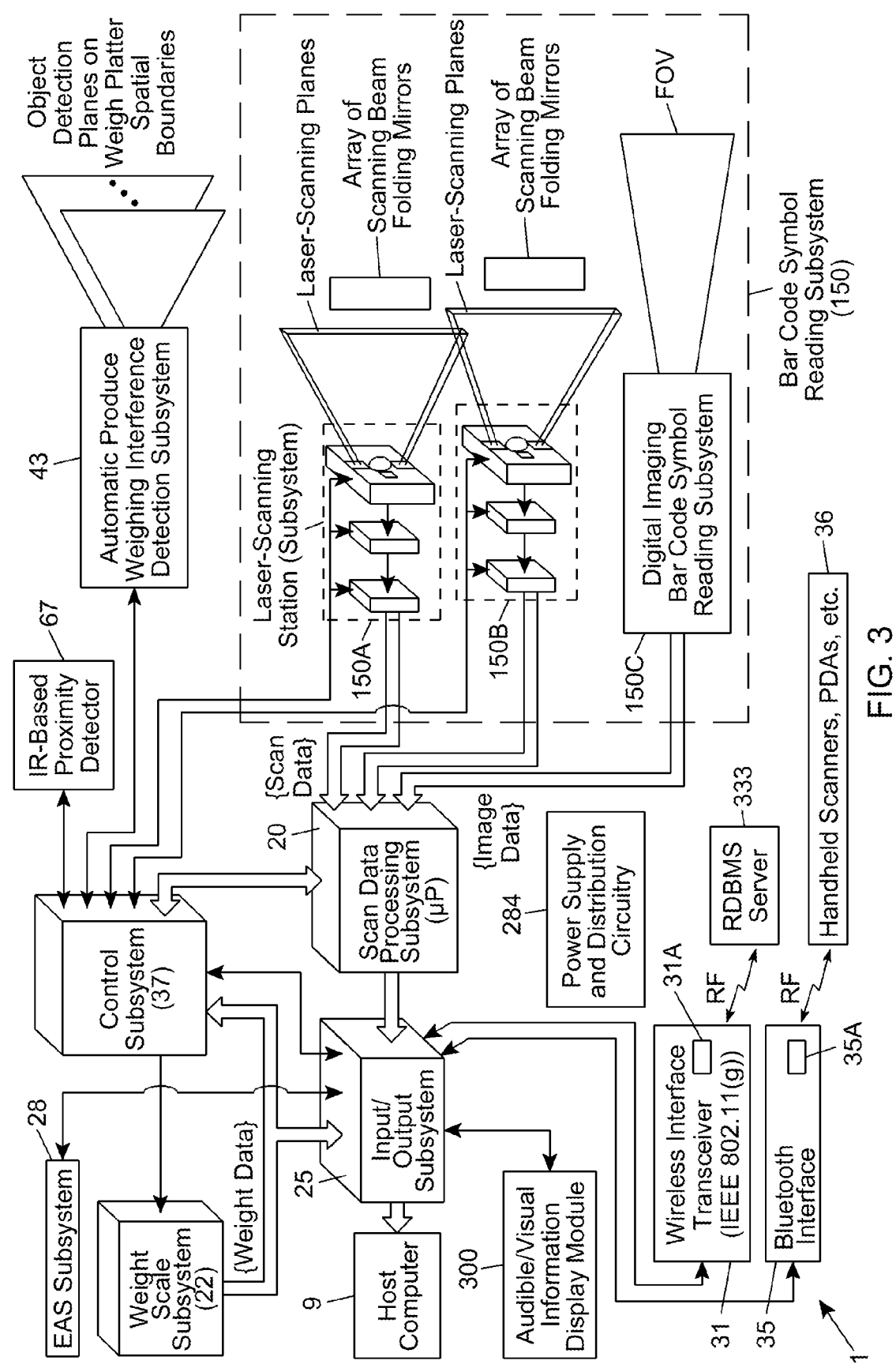
FIG. 3 is a block schematic representation of the POS-based bi-optical checkout/scale system shown in FIGS. 1A through 4, showing the primary components of the system, in addition to the object detection planes being generated about the edge boundaries of the weigh platter and 3D scanning volume.

As shown in FIG. 3, the bar code symbol reading system 150 also comprises at least one digital imaging bar code symbol reader 150C mounted within the system housing, and projecting one or more field of views (FOVs) and illumination beam coextensive therewithin through the vertical and/or horizontal scanning window, into the 3D scanning volume, for reading bar code symbols on objects (e.g. consumer products) being passed through the 3D scanning volume during bar code reading checkout operations. Details on controlling subsystems 150A, 150B and 150C are disclosed in U.S. patent application Ser. No. 13/160,873 filed Jun. 15, 2011, incorporated herein by reference.

As shown in FIG. 4, an IR-based proximity detector 67 is mounted in the front portion of the housing for automatically detecting the presence of a human operator in front of the 3D scanning volume during system operation. The function of the IR-based proximity detector 67 is to wake up the system (i.e. WAKE UP MODE), and cause a SLEEP Timer (T1) to be set to count how long the system has to read a bar code symbol (e.g. 15 minutes) before the system is automatically induced into its SLEEP MODE, where the polygon scanning element and laser diodes are deactivated to conserve electrical within the system. Preferably, the IR-based proximity (i.e. wake-up) detector 67 is realized using (i) and IR photo-transmitter for generating a high-frequency amplitude modulated IR beam, and (ii) a IR photo-receiver for receiving reflections of the amplitude modulated IR beam, using a synchronous detection circuitry, well known in the art.

As shown in the system diagram of FIG. 3, POS-based bi-optical scanning/scale system 1 generally comprises: a laser scanning subsystem 15 including laser scanning stations 15A and 15B for generating and projecting groups of laser scanning planes through the vertical and horizontal scanning windows 3A and 3B, respectively, and generating scan data streams from scanning objects in the 3D scanning volume defined between the scanning windows about weigh platter 29; a scan data processing subsystem (i.e. scan data processor) 20 for supporting automatic scan data processing based bar code symbol reading using scan data streams generated from stations 150A and 150B; an input/output subsystem 25 for interfacing with the image processing subsystem 20, the electronic weight scale subsystem 22, RFID reader 26, credit-card reader 27, Electronic Article Surveillance (EAS) Subsystem 28 (including a Sensormatic® EAS tag deactivation block 29 integrated in system, and an audible/visual information display subsystem (i.e. module) 300, and supporting universal, standard and/or proprietary data communication interfaces with host system 9 and other external devices; a BlueTooth® RF 2-way communication interface 135 including RF transceivers and antennas 103A for connecting to Blue-tooth® enabled hand-held scanners, imagers, PDAs, portable computers 136 and the like, for control, management, application and diagnostic purposes; digital imaging subsystem module 200 specified in FIG. 3, and having data/power/control interface 294 interfacing and establishing electrical interconnections with data/power/control interface 285 as shown in FIG. 1C; a control subsystem 37 for controlling (i.e. orchestrating and managing) the operation of the laser scanning stations (i.e. subsystems), the functions of the digital imaging subsystem 200, other subsystems supported in the system; IR-based wake-up detector 67, operably connected to the control subsystem 37, for generating and supplying a first trigger signal to the system controller in response to automatic detection of an operator in proximity (e.g. 1-2 feet) of the system housing; an IR-based automatic produce weighing interference detection subsystem 43, interfaced with system controller 37, for producing IR-based planar object detection fields at the spatial boundaries of the weigh platter 29, and corresponding edges of the 3D scanning volume of the system, as shown in FIGS. 1A and 4, for the purpose of (i) automatically detecting the motion of objects entering and exiting the 3D scanning volume during the bar code symbol reading mode of operation, and (ii) automatically detecting/monitoring interference conditions (i.e. produce items extending. In FIG. 3, the bar code symbol reading module employed along each channel of the scan data processing subsystem 20 can be realized using conventional bar code reading techniques, including bar code symbol stitching-based decoding techniques, well known in the art.

Figure 2A:
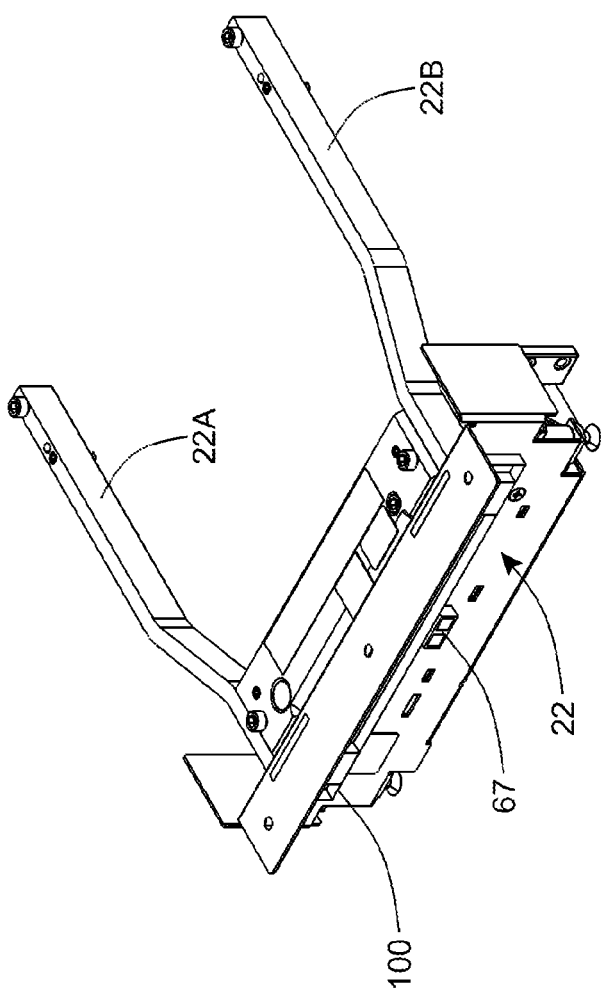
FIG. 2A is a perspective view of the electronic weigh system module removed from the POS-based bi-optical checkout/scale system shown in FIG. 1A, showing its cantilever arms extending freely away from its load cell module.
Figure 2C:
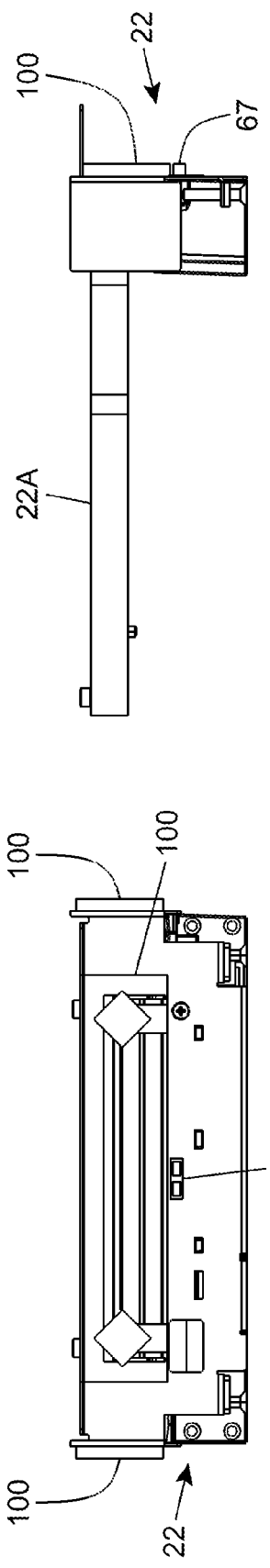
FIG. 2C is a side view of the electronic weigh system module removed from the POS-based bi-optical checkout/scale system shown in FIG. 1A.
Figure 2B:
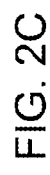
FIG. 2B is an elevated side view of the electronic weigh system module removed from the POS-based bi-optical checkout/scale system shown in FIG. 1A, showing its cantilever arms extending freely away from its load cell module.

In FIGS. 2A through 2C, the electronic weigh system module 22 is shown removed from the POS-based bi-optical checkout/scale system shown in FIG. 1A for the purpose of exposition, and showing its cantilever arms 22A and 22B disassociated from weigh platter 29, and extending freely away from its load cell module.

As shown in FIGS. 4 through 4A4, automatic produce weighing interference detection subsystem 43 comprises four pairs of spatially separated coplanar object detection modules 44A1 and 44A2, 44B1 and 44B2, 44C1 and 44C2, and 44D1 and 44D2, each pair of modules being located at one side of the weigh platter 29. Each pair of modules generates a pair of closely parallel IR-based object detection beams, which are projected substantially normal to the horizontal scanning window 3B, so as to automatically detect (i) when a produce items extends beyond the spatial boundaries of the weigh platter 29 during produce weighing operations, and also (ii) when an object enters and leaves (i.e. exits) the 3D scanning volume during bar code symbol reading operations. Each module 44 comprises an IR photo-receiver for receiving reflections of the amplitude modulated IR beam, using a synchronous detection circuitry, well known in the art.

Each coplanar object detection module 44A1, 44A2, 44B1, 44B2, 44C1, 44C2, 44D1 and 44D2, comprises: light transmission apertures 45 and 46 formed in a block or module 47, in co-aligned spatial relationship; an IR photo-transmitter (i.e. IR LED) 48 mounted on a printed circuit (PC) board 52, for generating a high-frequency amplitude modulated IR beam, supported in the module and provided with a cylindrical lens 48A to produce a planar IR light beam 50; an IR photo-receiver (i.e. IR photodiode) 51 mounted on PC board 52 within the block 47 for receiving over its FOV 53, return light generated by IR LED 48 and transmitted through aperture 46, in a coplanar manner with the planar IR beam 50, to produce a coplanar IR object illumination and detection plane 60. During operation, the amplitude modulated IR LED 48 is generated while the planar IR photodiode 51 synchronously detects through aperture 46, light energy reflected/scattered off objects in the FOV 53.

As shown in FIG. 4, the outputs of each of the coplanar object detection modules 44A1 through 44C2 are provided to processor 61, interfaced with system controller 37, and adapted for processing and generating control signals indicating different conditions when the system is engaged in different modes of operation. In particular, during the produce weighing mode, control signals generated from processor 61 indicate a detected condition of weighing interference or disruption (e.g. when a produce item is resting against the vertical housing portion, or extending over and beyond the spatial boundaries of the weigh platter). During the bar code symbol reading (produce checkout) mode, control signals generated from processor 61 can be used to indicate when an object enters the 3D scanning/imaging volume, when an object leaves the 3D scanning/imaging volume, when an object undergoes pass-through motion, and when an object undergoes presentation motion, as described in co-pending U.S. patent application Ser. No. 13/160,873 filed Jun. 15, 2011, and incorporated herein by reference.

FIGS. 5A through 5D describes various examples of produce item interference which can occur when weighing one or more produce items on the weight platter 29, using the POS-based bi-optical checkout/scale system of the illustrative embodiment.

Figure 5A:
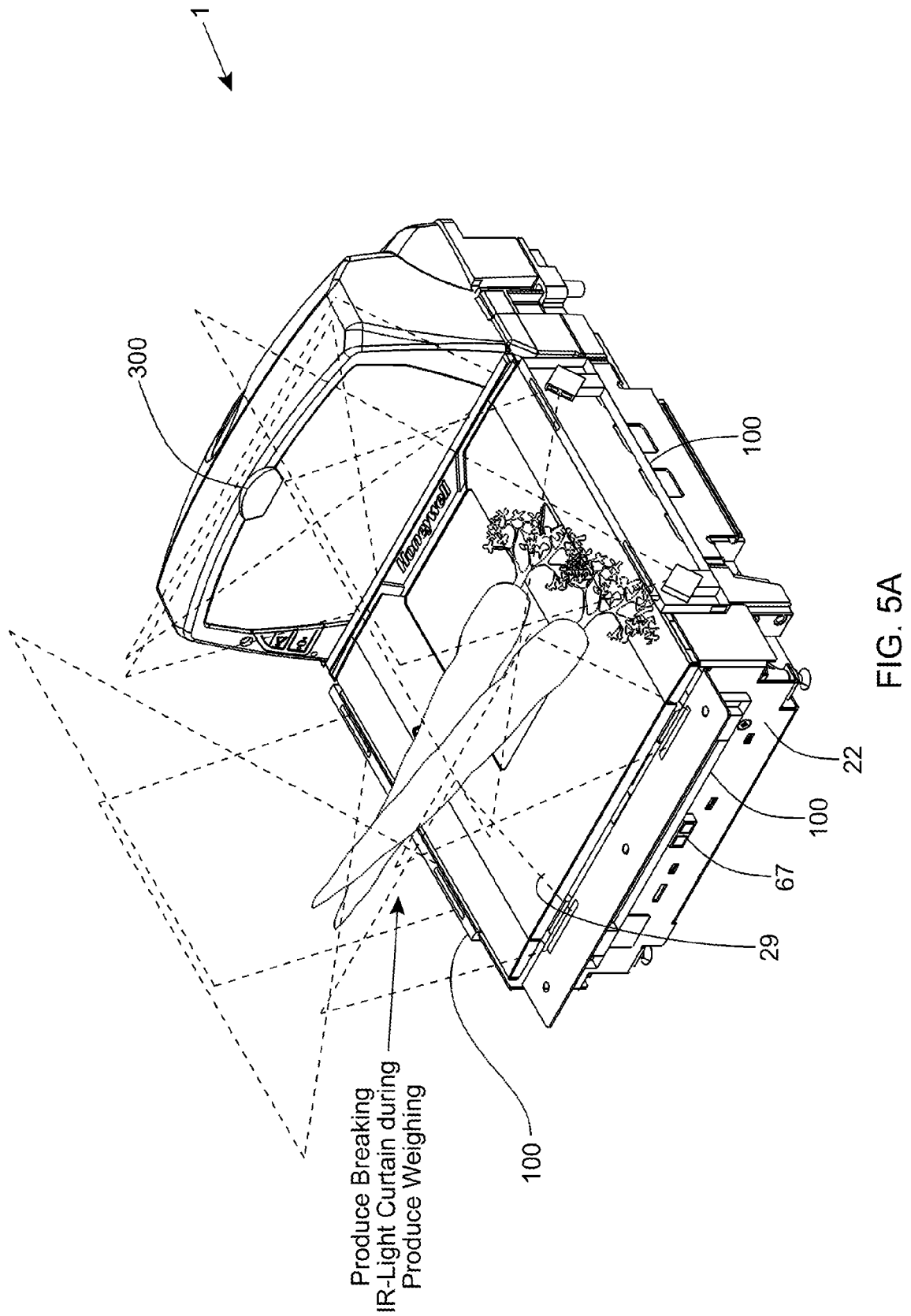
FIG. 5A is a perspective view of the POS-based bi-optical checkout/scale system of the illustrative embodiment shown being used to weigh a produce item (e.g. a bunch of carrots), where the produce item breaks (or interferes) with the left side edge of the IR-based light curtain about the weigh platter, and the automatic produce weighing interference detection subsystem automatically generates an alert signal to get the operator's attention so that the produce item will be repositioned on the weigh platter, and avoid produce weigh interference conditions during subsequent weigh operations.
Figure 5B:
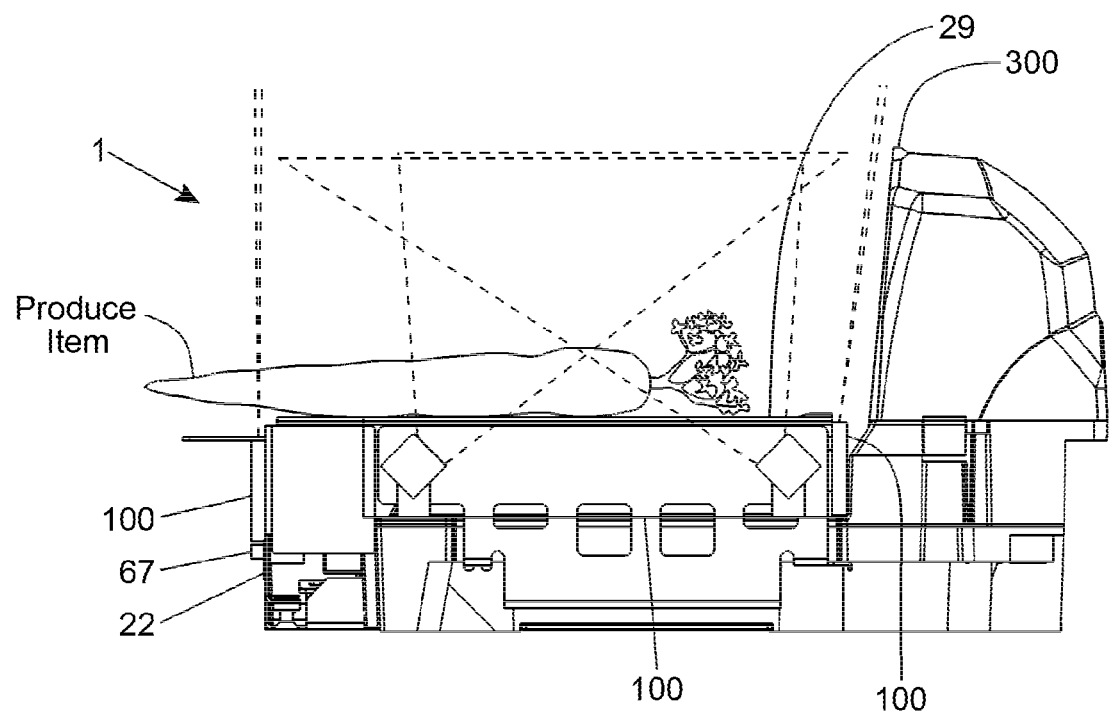
FIG. 5B is an elevated side view of the POS-based bi-optical checkout/scale system of the illustrative embodiment shown being used to weigh a produce item (e.g. a bunch of carrots), where the produce item breaks (or interferes) with the front edge portion of the IR-based light curtain about the weigh platter, and the automatic produce weighing interference detection subsystem automatically generates an alert signal to get the operator's attention so that the produce item will be repositioned on the weigh platter, and avoid produce weigh interference conditions during subsequent weigh operations.
Figure 5C:
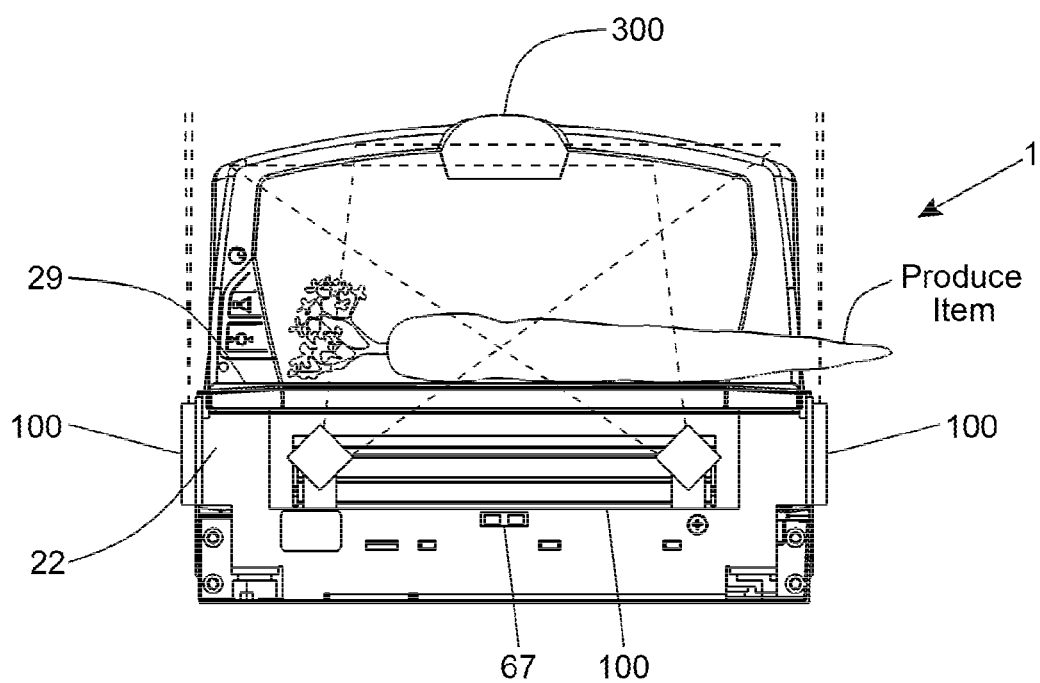
FIG. 5C is an elevated front view of the POS-based bi-optical checkout/scale system of the illustrative embodiment shown being used to weigh a produce item (e.g. a bunch of carrots) where the produce item breaks (or interferes) with the right side edge portion of the IR-based light curtain about the weigh platter, and the automatic produce weighing interference detection subsystem automatically generates an alert signal to get the operator's attention so that the produce item will be repositioned on the weigh platter, and avoid produce weigh interference conditions during subsequent weigh operations.
Figure 5D:
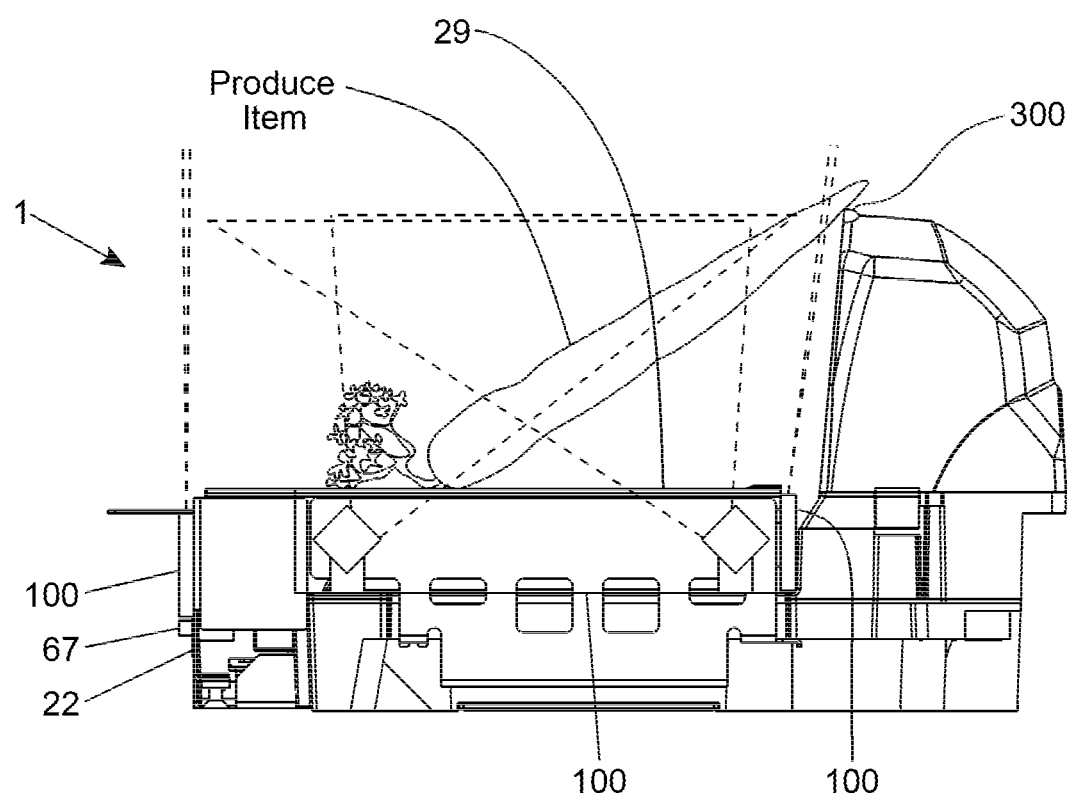
FIG. 5D is an elevated front view of the POS-based bi-optical checkout/scale system of the illustrative embodiment shown being used to weigh a produce item (e.g. a bunch of carrots), where the produce item breaks (or interferes) with the rear edge portion of the IR-based light curtain about the weigh platter, and the automatic produce weighing interference detection subsystem automatically generates an alert signal to get the operator's attention so that the produce item will be repositioned on the weigh platter, and avoid produce weigh interference conditions during subsequent weigh operations.

FIG. 5A shows the POS-based bi-optical checkout/scale system being used to weigh a produce item (e.g. a bunch of carrots), and where the produce item breaks (or interferes) with the left side edge of the IR-based light curtain about the weigh platter 29. FIG. 5B shows the POS-based bi-optical checkout/scale system weighing a produce item (e.g. a bunch of carrots), where the produce item breaks (or interferes) with the front edge portion of the IR-based light curtain about the weigh platter 43. FIG. 5C shows the POS-based bi-optical checkout/scale system weighing a produce item (e.g. a bunch of carrots) where the produce item breaks (or interferes) with the right side edge portion of the IR-based light curtain about the weigh platter 29. FIG. 5D shows the POS-based bi-optical checkout/scale system of the illustrative embodiment weighing a produce item (e.g. a bunch of carrots), where the produce item breaks (or interferes) with the rear edge portion of the IR-based light curtain about the weigh platter 29. In each instance shown in these drawings, the automatic produce weighing interference detection subsystem 43 automatically generates an alert signal from subsystem 300 to get the operator's attention so that the produce item will be repositioned on the weigh platter, and avoid produce weigh interference conditions during subsequent weigh operations.

By automatically monitoring produce item interference events during produce weighing operation, and generating audible and/or visual alerts using subsystem 300, the programmed system controller 37 ensures that the operator is weighing produce so as to minimize "shrinkage" at the POS station. As all events are monitored, logged and recorded during system operation, the system 1 can periodically produce performance reports, indicating if any produce interference events where detected and not corrected produce weighing operations. Retail managers can subsequently analyze such reports, and use the same to properly instruct and train operators to proper practices.

Also, during bar code symbol reading operations, subsystem 43 can be used to record cashier/operator scanning motion behavior for subsequent analysis and performance measurement, in an effort to improve cashier throughput and productivity.

Upon power up, the system enters its sleep mode, until an operator is detected by IR-based wake-up proximity detector 67. Once this condition is detected, the system enters its bar code symbol reading mode and remains in this mode during bar code symbol reading (i.e. product checkout) operations. Once a produce item is placed on weigh platter 29, the detected weight of the object automatically generates a weigh data signal that is detected by the control subsystem 37, and automatically activates the automatic produce weighing interference detection subsystem 43, generating the IR-based light curtain all about the spatial boundaries of the weigh platter 29 typically coextensive with the geometrical boundaries of the 3D scanning volume supported by the POS-based bi-optical scanning/scale system.

Figure 6:
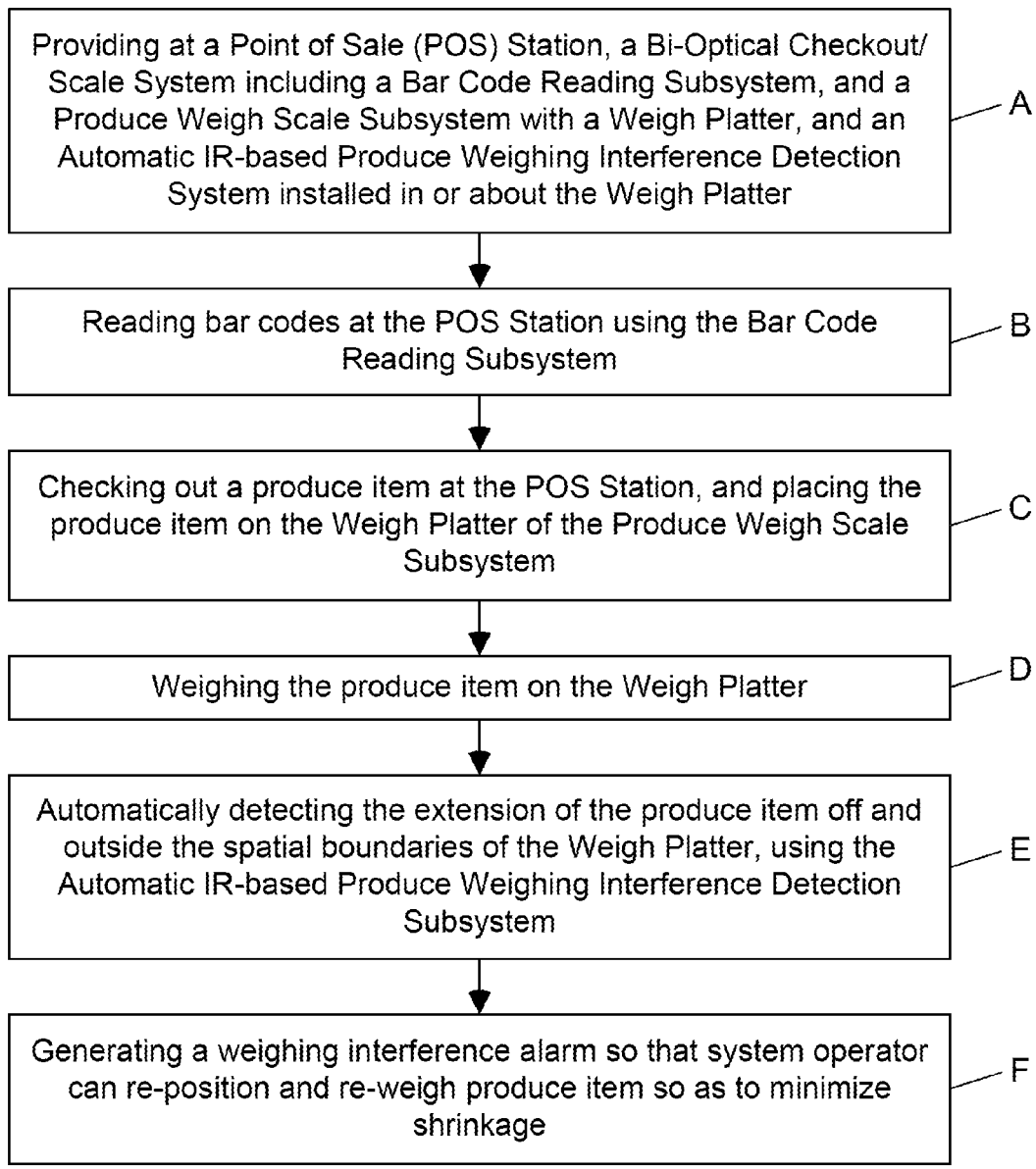
FIG. 6 is a flow chart describing a process for automatically detecting produce weighing interferences on the POS-based bi-optical checkout/scale system of the illustrative embodiment.
Figure 7:
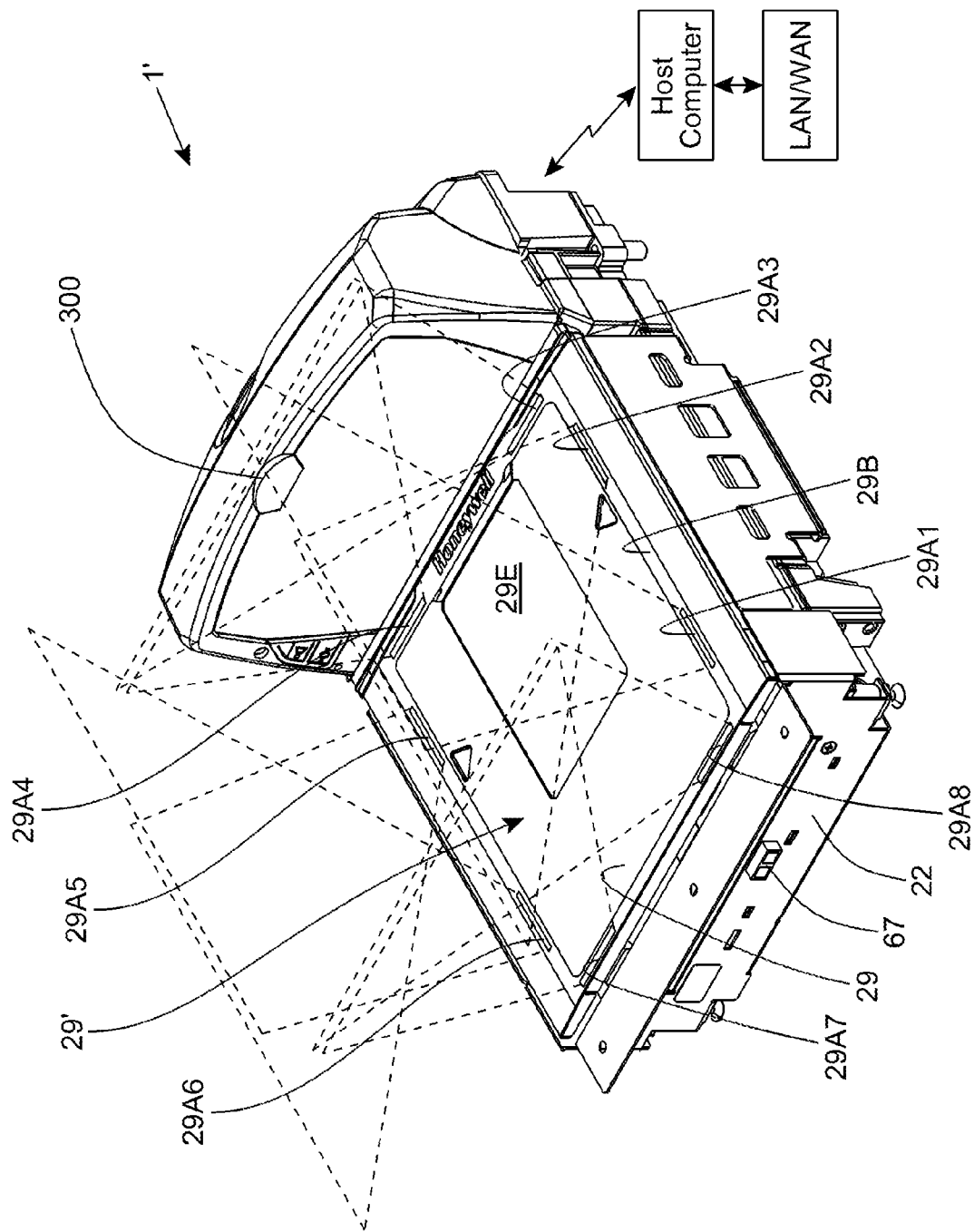
FIG. 7 is a perspective view of an alternative POS-based bi-optical checkout/scale system employing a weigh platter assembly, supporting the generation and projecting of object detection planes from thin apertures formed in along the edges of the weigh platter, for the purpose of implementing the automatic produce weighing interference detection subsystem.

FIG. 6 describes the process supported by the controller 37 within the POS-based bi-optical scanning/scale system of the illustrative embodiment, to automatically detect produce weighing interferences during produce weighing operations.

As indicated at Block A in FIG. 6, bi-optical scanning/scale system 1 is installed at a retail POS station, and configured for operation as described above.

As indicated at Block B, the bi-optical scanning/scale system is used to read bar code symbols on products being checked out for purchase.

As indicated at Block C, the bi-optical scanning/scale system is used to checkout produce items at the POS station, by placing each produce item to be checked out on the weigh platter 29 of the system.

As indicated at Block D, the bi-optical scanning/scale system measures the weight of the produce item on the weigh platter, and computes the price of the weighed item based on price/unit weigh data stored in the system.

As indicated at Block E, during produce weighing operations, the bi-optical scanning/scale system automatically detects when the produce item extends off or beyond the spatial boundaries of the weigh platter, or other weigh interference conditions (e.g. produce learning against the vertical housing window surface).

As indicated at Block F, in response to the detected weigh interference condition at Block E, the bi-optical scanning/scale system automatically generates a weighing interference alarm so that the system operator can re-position and re-weigh produce to reduce shrinkage at the retail POS station.

A preferred embodiment of the automatic produce weighing interference detection subsystem 43 has been described above, employing IR-based object detection techniques, with the advantage of using no moving parts. However, it is possible to implement the automatic produce weighing interference detection subsystem 43 using alternative techniques.

FIGS. 7, 8A, 8B and 9 show an alternative POS-based bi-optical checkout/scale system employing a weigh platter embodying IR-based light curtain generating apparatus similar to that disclosed in FIGS. 4A1 through 4A4.

As shown in FIG. 8, the automatic produce weighing interference detection subsystem 43 in this illustrative embodiment involves installing linear arrays of IR-based LEDs (or laser diodes LDs) and photo-diodes about the perimeter of the weigh platter 29 to create an object-detecting light curtain, capable of detecting (i.e. monitoring) produce weighing interference conditions occurring during produce weighing operations.

Preferably, this embodiment is implemented by mounting, beneath each thin elongated aperture 29A1 through 29A8 formed in a platter framework 29B, an IR-based object detection module 44 shown in FIG. 4A1 comprising a coplanar-aligned IR-based LED (or LD) 48 and cylindrical optics 48A and a photo-diode 51 (shown in FIGS. 4A1 through 4A4). The platter framework 29B can be made from a rigid plastic material, or a rubberized material that snap fits about the metal weigh platter 29.

Figure 8A:
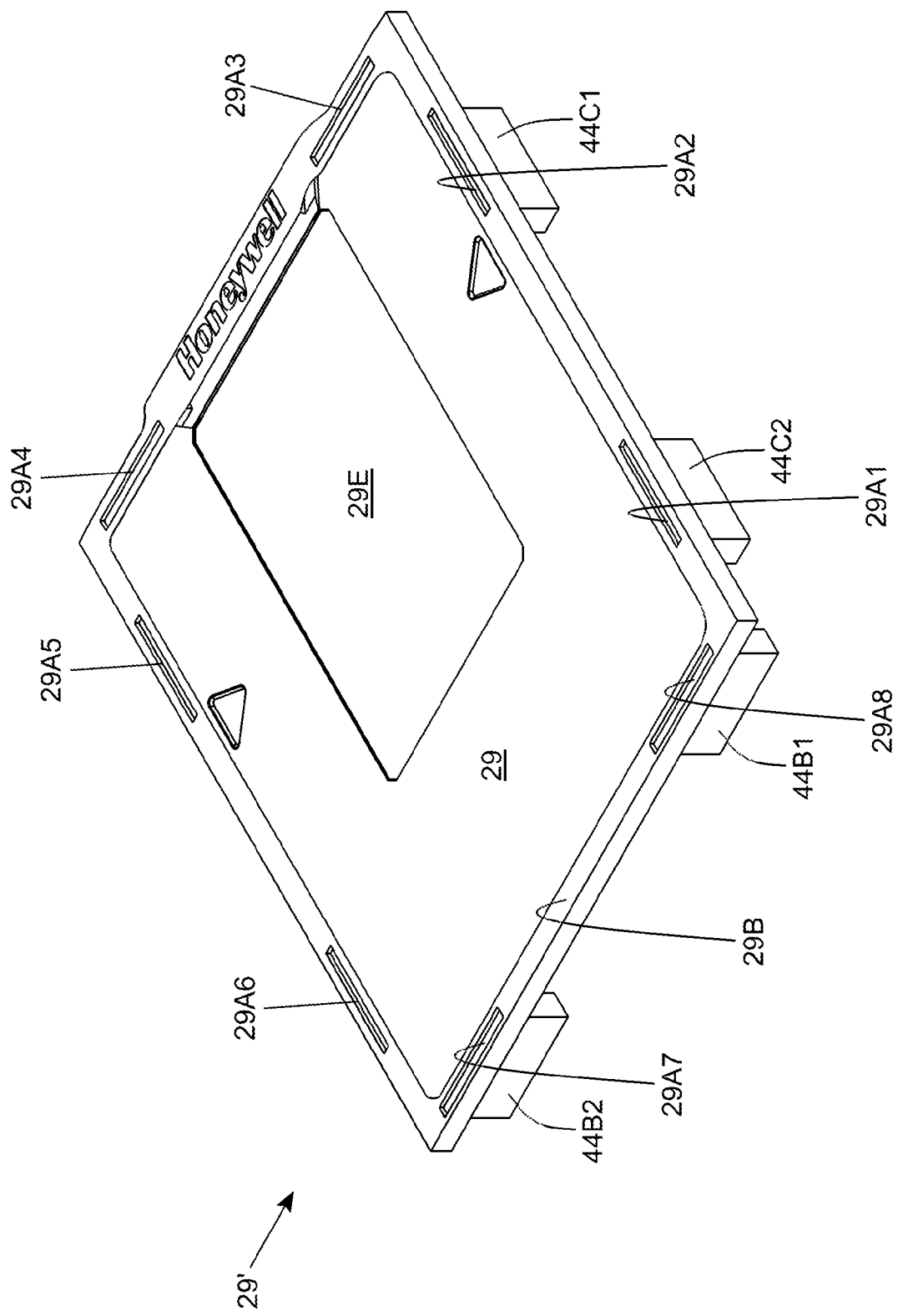
FIG. 8A is a top perspective view of the weigh platter assembly employed in the POS-based bi-optical checkout/scale system of FIG. 7, showing the weigh platter supported within a framework structure embodying miniature IR-based object detection modules associated with the automatic produce weighing interference detection subsystem.
Figure 8B:
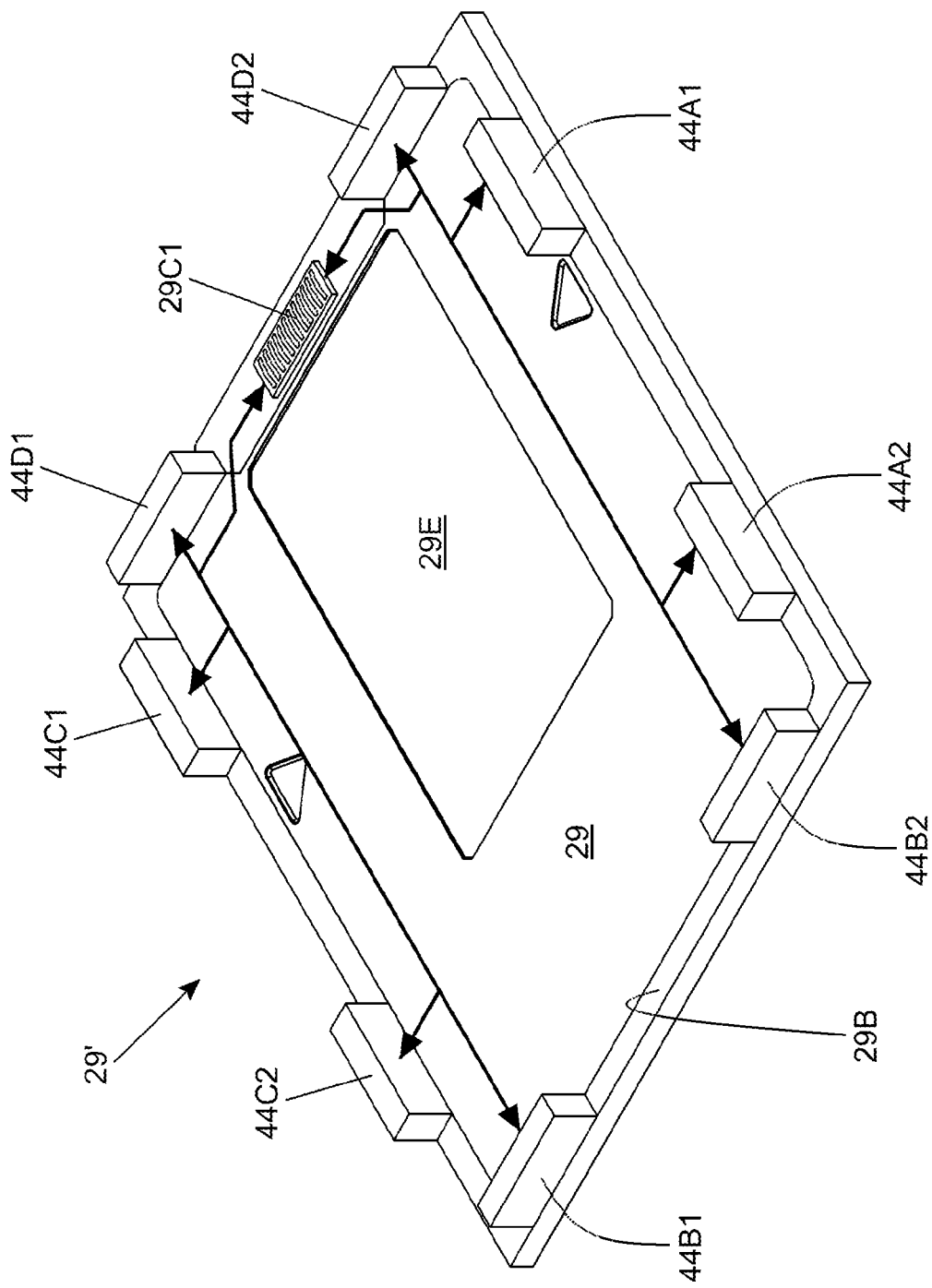
FIG. 8B is a bottom perspective view of the weigh platter assembly employed in the POS-based bi-optical checkout/scale system of FIG. 7, showing the framework structure supporting the weigh platter and embodying miniature IR-based object detection modules associated with the automatic produce weighing interference detection subsystem.
Figure 9:
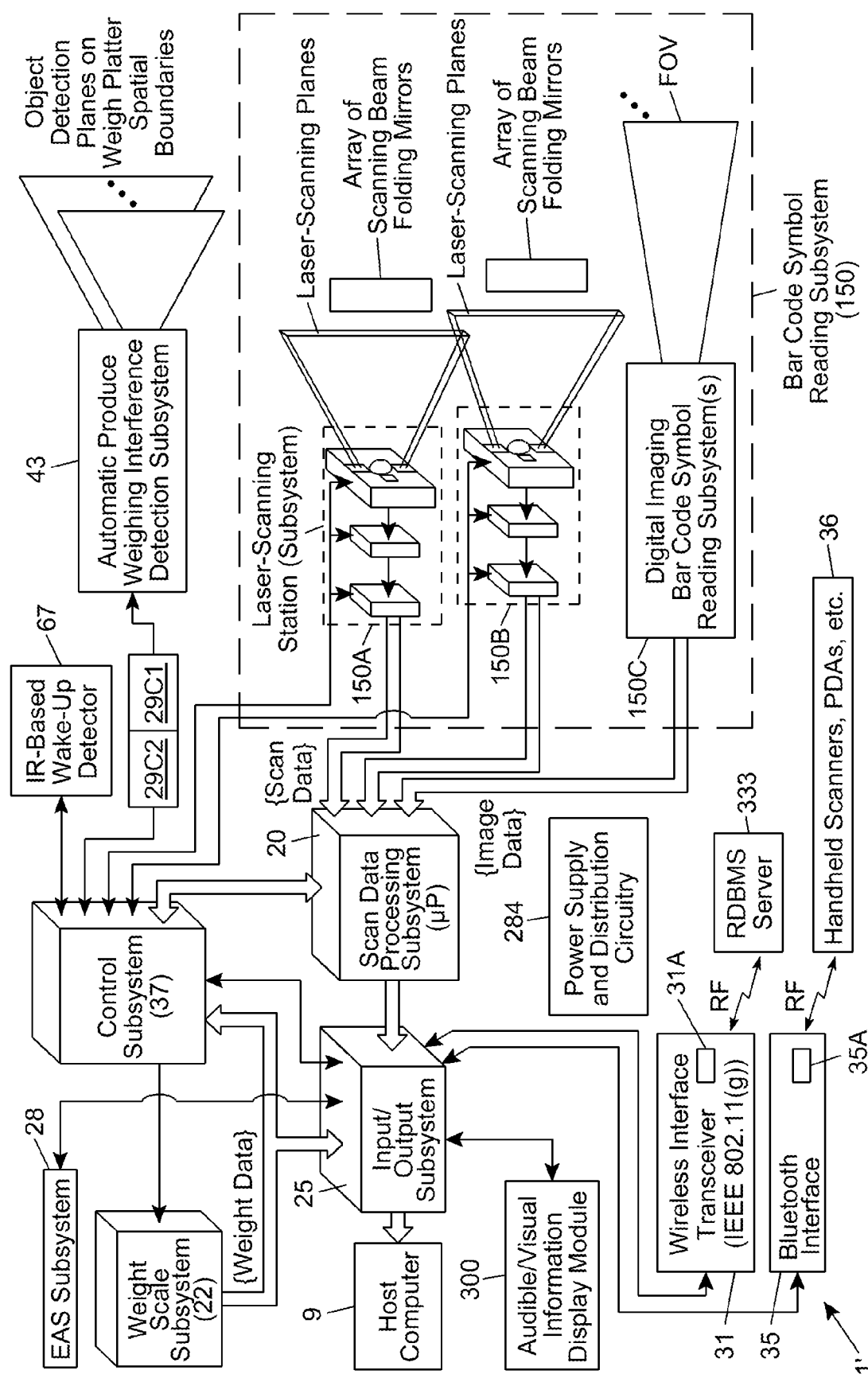
FIG. 9 is a block schematic representation of the POS-based bi-optical checkout/scale system shown in FIG. 7, showing the primary components of the system in this alternative illustrative embodiment.

As shown in FIGS. 8A and 8B, the rigid metal weigh platter 29 is mounted within the platter framework 29B, in a secure manner, to provide an intelligent "weighing interference condition detecting" weigh platter assembly 29' embodying within its framework 29B, IR-based light curtain generating apparatus that is functionally similar to the one described hereinabove in connection with the first illustrative embodiment. As shown, the platter framework 29B has a central light transmission aperture that spatially corresponds with the light transmission aperture 29E formed in weigh platter 29, so that laser scanning planes and/or FOVs can be projected therethrough during system operation.

As shown in FIG. 8B, the platter framework 29B can be equipped with a contact-type interface 29C 1 beneath the weigh platter that establishes electrical contact with a matching contact-type interface 29C2 mounted in the horizontal housing portion when the weigh platter assembly is supported by the cantilever arms 22A, 22B. Optionally, driver circuits can be realized on a small PC board also embedded within the plastic framework 29B, beneath the weigh platter 29.

During produce weighing operations, each IR-based object detection module 44 will generate an IR-based light detection plane through its respective aperture (29A1 through 29A8), to form an IR-based light curtain extending about the perimeter of the weigh platter assembly 29'. The function of the light curtain is to automatically detect weighing interference or disruption conditions, and to use such detected events to generate audible and/or visible signal from display 300 to alert the system operator to reposition interfering produce items, enable accurate produce weight measurement, and thereby reduce shrinkage at the retail POS station.

In another alternative embodiment, automatic produce weighing interference detection subsystem 43 could be implemented using one or more light beam scanning mechanisms, employing IR-based laser diodes, one or more polygon scanning elements, and light deflection mirrors, arranged within the horizontal housing section in a compact manner. The object of the light beam scanning apparatus would be to sweep IR-based light beams upwardly alongside the weigh platter 29 to create an IR-based light curtain extending around the spatial boundaries weigh platter 229, similar to the light curtain generated by the IR-based produce weighing interference detection subsystem 43.

These and other alternative techniques will occur to those skilled in the art having the benefit of the present disclosure.

It is understood that a hybrid-based bar code symbol reading system, as disclosed in co-pending U.S. patent application Ser. No. 13/017,289 filed Jan. 31, 2011, incorporated herein by reference, can be used to implement the bar code symbol reading subsystem functionality employed in the POS-based bi-optical checkout/scale system of the present disclosure. Further, while the produce weigh scale subsystem 22 employs a pair of cantilever arms for supporting the weigh platter 29, it is understood that different weigh measuring configurations can be used, such as disclosed in co-pending U.S. patent application Ser. No. 13/019,439 filed Feb. 2, 2011, incorporated herein by reference.

The above disclosure has been provided as an illustrative example of how the POS-based bi-optical checkout/scale system 1 can be practiced in a POS-based environment. Variations and modifications to this embodiment will readily occur to those skilled in the art having the benefit of the present disclosure. All such modifications and variations are deemed to be within the scope of the accompanying Claims.

The invention claimed is:

1. A system, comprising:
   a housing having a horizontal scanning window;
   a laser scanning subsystem for projecting a laser scanning pattern through the horizontal scanning window and producing scan data for objects;
   a scan data processor for processing the scan data produced by the laser scanning subsystem in an effort to read symbols on objects;
   a weigh scale subsystem comprising a weigh platter above the horizontal scanning window, the weigh scale subsystem for weighing objects placed on the weigh platter and producing weigh data representative of the weight of objects weighed on the weigh platter; and
   a weighing interference detection subsystem for projecting pairs of overlapping planar IR-based object detection planes normal to the weigh platter about the outer edges of the weigh platter to detect weighing interference conditions and generating control signals indicative of detected weighing interference conditions.

2. The system of claim 1, wherein the weighing interference conditions comprise detecting an object extending over the weigh platter's spatial boundaries.

3. The system of claim 1, wherein the laser scanning pattern is an omni-directional laser scanning pattern.

4. The system of claim 1, wherein the weighing interference detection subsystem comprises object detection modules for projecting the pairs of overlapping planar IR-based object detection planes.

5. The system of claim 4, wherein each object detection module comprises a pair of optical devices for generating and projecting a pair of IR-based object sensing planes located.

6. The system of claim 1, wherein the weighing interference detection subsystem comprises a display device for indicating the detected weighing interference conditions.

7. A system, comprising:
a housing having a horizontal scanning window;
an imaging-based symbol reading subsystem for capturing images of objects on or above the horizontal scanning window and processing the captured images in an effort to read symbols on objects;
a weigh scale subsystem comprising a weigh platter above the horizontal scanning window, the weigh scale subsystem for weighing objects placed on the weigh platter and producing weigh data representative of the weight of objects weighed on the weigh platter; and
a weighing interference detection subsystem for projecting pairs of overlapping planar IR-based object detection planes normal to the weigh platter about the outer edges of the weigh platter to detect weighing interference conditions and generating control signals indicative of detected weighing interference conditions.

8. The system of claim 7, wherein the weighing interference conditions comprise detecting an object extending over the weigh platter's spatial boundaries.

9. The system of claim 7, the weighing interference detection subsystem comprises object detection modules for projecting the pairs of overlapping planar IR-based object detection planes.

10. The system of claim 9, wherein each object detection module comprises:
an IR-based light source for generating and projecting a IR-based object sensing plane located; and
a photo-diode for detecting reflections of the IR-based object sensing plane off an object extending over the weigh platter's spatial boundaries.

11. The system of claim 7, wherein the weighing interference detection subsystem comprises a display device for indicating the detected weighing interference conditions.

12. A method of weighing objects on a weigh platter having outer edges, comprising:
projecting pairs of overlapping planar IR-based object detection planes normal to the weigh platter about the outer edges of the weigh platter;
detecting, with the projected pairs of overlapping planar IR-based object detection planes, if one or more objects are extending over an outer edge of the weigh platter;
weighing an object on the weigh platter; and
if an object extending over an outer edge of the weigh platter is not detected, transmitting the weight of the object;
if an object extending over an outer edge of the weigh platter is detected, not transmitting the weight of the object.

13. The method of claim 12, comprising, in response to the detection of an object extending over an outer edge of the weigh platter, alerting a cashier.

14. The method of claim 12, comprising detecting reflections of the IR-based object detection planes from objects extending beyond the outer edges of said weigh platter.

15. The method of claim 12, comprising generating audible and/or visual signals indicating the detection of an object extending over a spatial boundary of the weigh platter.

16. The method of claim 12, comprising scanning an object on the weigh platter with a plurality of laser scanning planes.

17. The method of claim 12, comprising scanning an object on the weigh platter with an omni-directional laser scanning pattern.

18. The method of claim 12, comprising capturing an image of an object on the weigh platter.

19. The method of claim 12, comprising detecting the presence of an operator in proximity to the weigh platter.

20. The method of claim 12, comprising:
capturing an image of an object on the weigh platter; and
processing the captured image in an effort to read symbols on the object.

* * * * *